United States Patent
Zhou et al.

(10) Patent No.: US 9,049,336 B2
(45) Date of Patent: Jun. 2, 2015

(54) AUTO-DETECT METHOD FOR DETECTING IMAGE FORMAT AND PLAYBACK METHOD APPLYING THE SAME

(75) Inventors: Lei Zhou, Shanghai (CN); Heng Yu, Shanghai (CN); Chun Wang, Shanghai (CN)

(73) Assignee: NOVATEK MICROELECTRONICS CORP., Hsinchu (TW)

( * ) Notice: Subject to any disclaimer, the term of this patent is extended or adjusted under 35 U.S.C. 154(b) by 407 days.

(21) Appl. No.: 13/592,794

(22) Filed: Aug. 23, 2012

(65) Prior Publication Data

US 2013/0162769 A1 Jun. 27, 2013

(30) Foreign Application Priority Data

Dec. 21, 2011 (CN) .......................... 2011 1 0433424

(51) Int. Cl.
   *H04N 15/00* (2006.01)
   *H04N 13/00* (2006.01)
   *H04N 3/27* (2006.01)
   *H04N 5/14* (2006.01)

(52) U.S. Cl.
   CPC .............. *H04N 5/14* (2013.01); *H04N 13/0007* (2013.01); *H04N 13/0029* (2013.01); *H04N 2213/007* (2013.01); *H04N 2013/0074* (2013.01)

(58) Field of Classification Search
   CPC .............................. H04N 5/14; H04N 13/0007
   See application file for complete search history.

(56) References Cited

U.S. PATENT DOCUMENTS

2011/0164110 A1* 7/2011 Fortin et al. ..................... 348/43

FOREIGN PATENT DOCUMENTS

| TW | 201019237 A | 5/2010 |
| TW | 201143368 A | 12/2011 |
| TW | 201143446 A | 12/2011 |

OTHER PUBLICATIONS

Office Action issued by Taiwan Intellectual Property Office on Feb. 14, 2014.

* cited by examiner

*Primary Examiner* — Jefferey Harold
*Assistant Examiner* — Sean Haiem
(74) *Attorney, Agent, or Firm* — Rabin & Berdo, P.C.

(57) ABSTRACT

An auto-detect method for detecting a single-frame image format is provided. A single-frame image is divided into a plurality of macro-blocks. Each of the macro-blocks is divided into a plurality of sub-blocks. A meta-block is allocated in each of the sub-blocks. A pixel luminance sum characteristic value for each of the meta-blocks is calculated. A first confidence between a left half and a right half of the single-frame image is calculated according to the pixel luminance sum characteristic values. A second confidence between an upper half and a lower hap of the single-frame image is calculated according to the pixel luminance sum characteristic values. A format of the single-frame image is determined according to the pixel luminance sum characteristic values, and the first and second confidences of the single-frame image.

22 Claims, 4 Drawing Sheets

AUTO-DETECT METHOD FOR DETECTING IMAGE FORMAT AND PLAYBACK METHOD APPLYING THE SAME

This application claims the benefit of People's Republic of China application Serial No. 201110433424.3, filed Dec. 21, 2011, the subject matter of which is incorporated herein by reference.

BACKGROUND

1. Field of the Disclosure

The disclosure relates to an auto-detect method for detecting an image/video format and a playback method applying the same.

2. Description of the Related Art

Three-dimensional (3D) displays (e.g., 3D televisions and 3D computer monitors) are prevalent display devices. A 3D display device is capable of displaying 2D contents in addition to 3D contents. To display different contents, the 3D display device needs to employ different playback modes. A current single-frame 3D format is categorized into two types—side-by-side (SBS) and top-and-bottom (TB). Therefore, the 3D display device needs to identify a suitable mode of an image from 2D format, a 3D SBS format and a 3D TB format.

In a 3D SBS image, a left-eye image and a right-eye image are placed side-by-side to each other, and respectively have a resolution of one-half of a normal resolution in the horizontal direction to add up to the normal resolution. For example, assuming that the resolution is 1920×1080, the respective resolution of the left-eye image and the right-eye image is 960×1080.

In a 3D TB image, a respectively vertical resolution of the left-eye image and the right-eye image is one-half of a normal resolution. For example, assuming that the resolution is 1920×1080, the respectively resolution of the left-eye image and the right-eye image is 1920×540.

When playing a 3D image/video, a 3D display device needs to first switch a playback mode to a 3D playback mode, or else playback quality could be quite unsatisfactory if the 3D image/video is played as a 2D image/video in a 2D playback mode. If the 3D display device is not correctly switched to the 3D playback mode, a viewer may observe that the SBS 3D video is divided into a left half and a right half.

Therefore, the disclosure provides an auto-detect method for detecting an image format and a playback method applying the auto-detect method, which are capable of automatically detecting a single-frame format for switching to a correct playback mode.

SUMMARY OF THE DISCLOSURE

The disclosure relates to an auto-detect method for detecting an image/video format, which determines whether the image format is a side-by-side (SBS) format by detecting a similarity between a left half and a right half of a single-frame image.

The disclosure relates to an auto-detect method for detecting an image/video format, which determines whether the image format is a top-and-bottom (TB) format by detecting a similarity between an upper half and a lower half of a single-frame image.

The disclosure relates to an auto-detect method for detecting an image/video format, which determines a single-frame image as a 2D format when it is confirmed that the single-frame image is neither SBS format nor TB format.

According to an exemplary embodiment of the present disclosure, an auto-detect method for detecting a single-frame image format is provided. The method includes steps of: dividing a single-frame image into a plurality of macro-blocks; dividing each of the macro-blocks into a plurality of sub-blocks; generating a meta-block in each of the sub-blocks; calculating a pixel luminance sum characteristic value for each of the meta-blocks; calculating a first confidence between a left half and a right half of the single-frame image according to the pixel luminance sum characteristic values; calculating a second confidence between an upper half and a lower half of the single-frame image according to the pixel luminance sum characteristic values; and determining a format of the single-frame image according to the pixel luminance sum characteristic values, and the first and second confidences of the single-frame image.

According to another exemplary embodiment, a playback method for a single-frame image is provided. The playback method includes steps of: dividing a single-frame image into a plurality of macro-blocks; dividing each of the macro-blocks into a plurality of sub-blocks; generating a meta-block in each of the sub-blocks; calculating a pixel luma sum characteristic value for each of the meta-blocks; determining whether a first half and a second half of the single-frame image are similar according to the pixel luminance sum characteristic values; determining the single-frame image as in a 3D image format when the first half and the second half are similar; and playing the single-frame image according to the determined image format.

The above and other contents of the disclosure will become better understood with regard to the following detailed description of the preferred but non-limiting embodiments. The following description is made with reference to the accompanying drawings.

DETAILED DESCRIPTION OF THE DISCLOSURE

Due to the image depth, a left half and a right half of a 3D SBS image are in fact not entirely identical although appearing very similar. Likewise, due to the image depth, an upper half and a lower half of a 3D TB image are in fact not entirely identical although appearing very similar. Therefore, in this embodiment of the present disclosure, the above principle is utilized for determining whether an image is in a 2D or 3D format, as well as for determining whether a 3D image format is an SBS format or a TB format.

Figure 1:
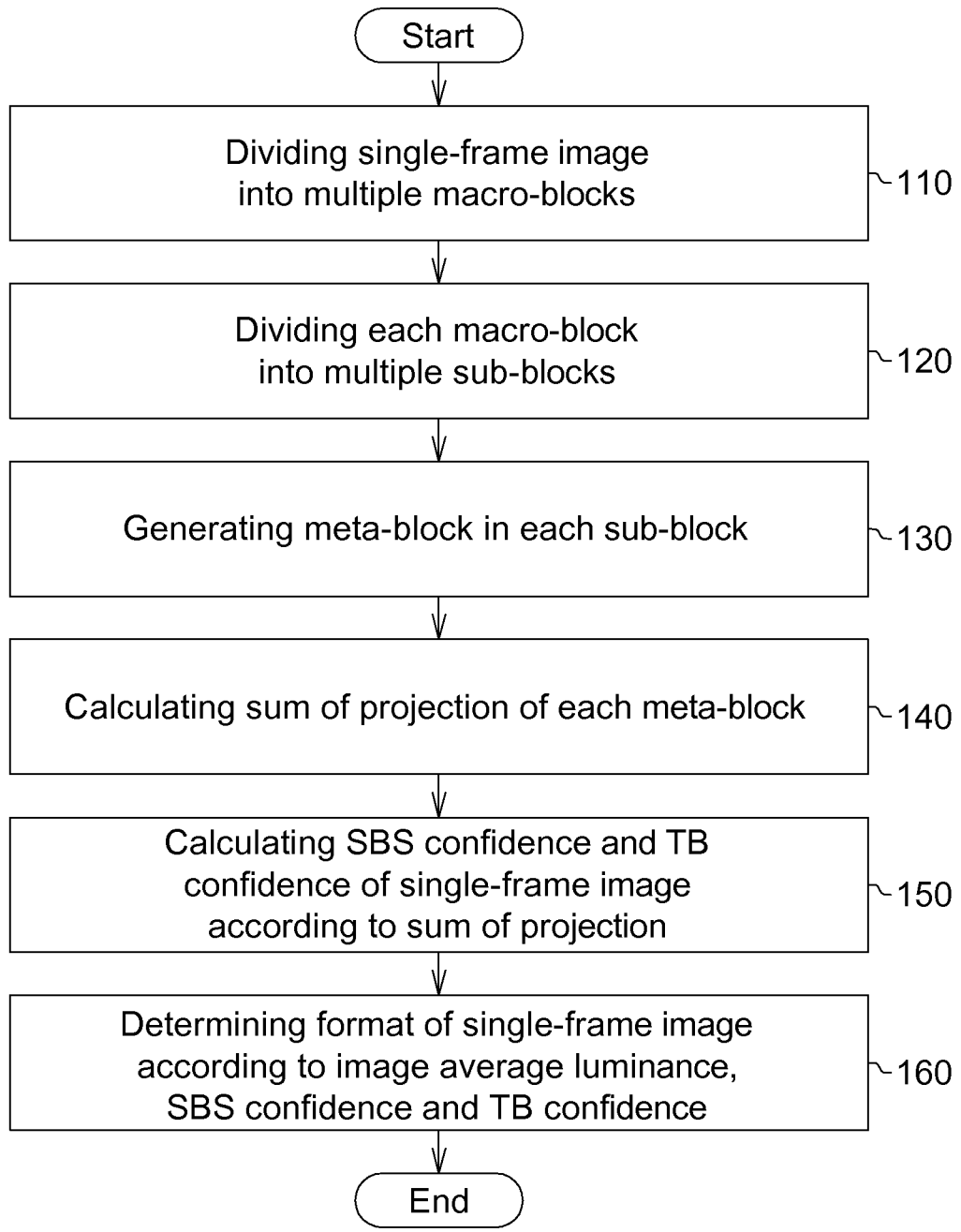
FIG. 1 is a flowchart of an auto-detect method for detecting an image format according to an embodiment of the present disclosure.

FIG. 1 shows a flowchart of an auto-detect method for detecting an image format according to an embodiment of the present disclosure.

Figure 2:
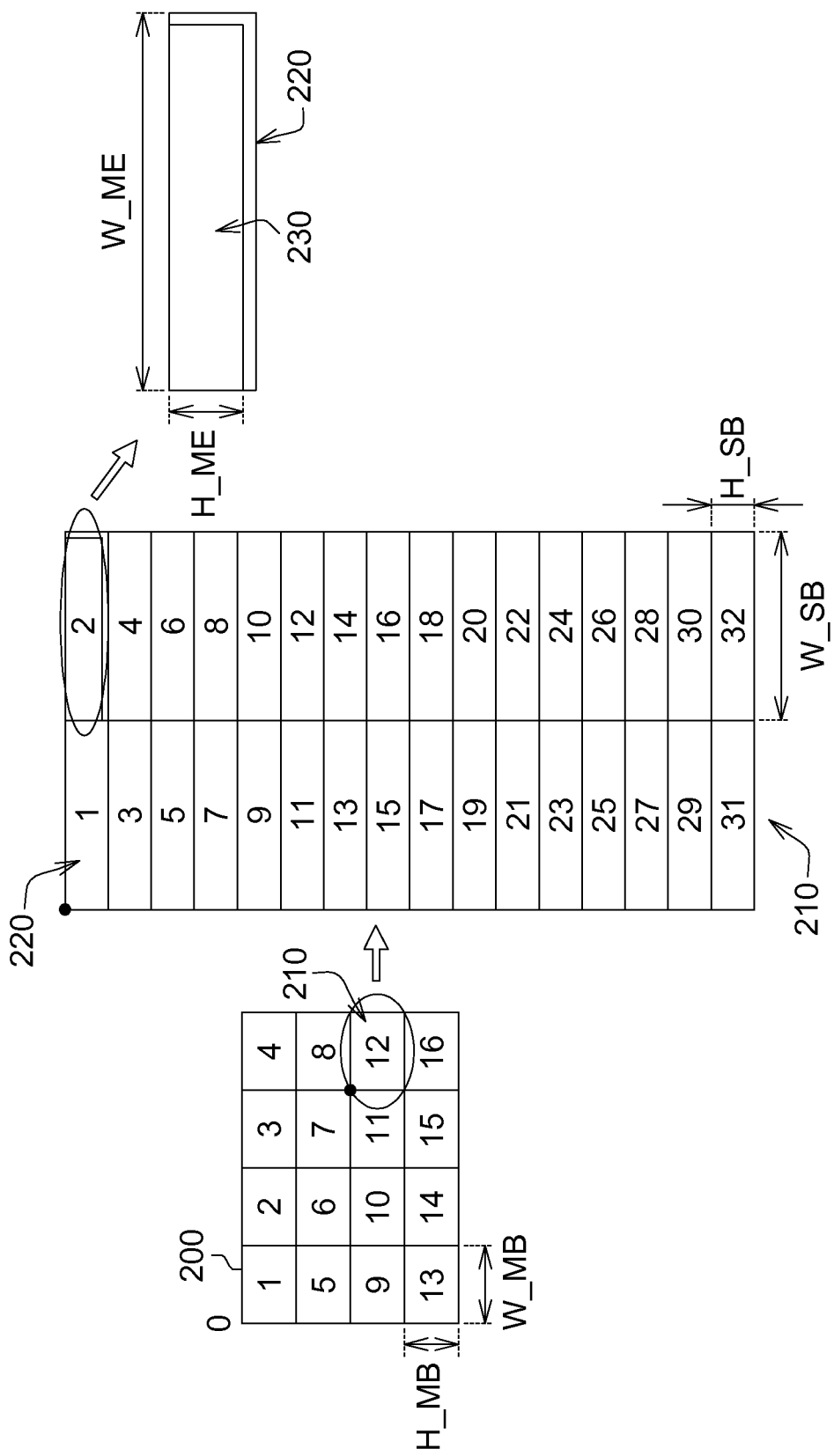
FIG. 2 is a schematic diagram illustrating macro-blocks, sub-blocks and meta-blocks according to an embodiment of the present disclosure.

In Step 110, a single-frame image is divided into a plurality of macro-blocks. As shown in FIG. 2, the image is divided into $N_{macro}$ macro-blocks. For illustrative purposes, the macro-blocks are respectively assigned with numbers 1, 2, ..., to $N_{macro}$. More specifically, for example, the image is horizontally divided into $2^{N_{mac-H}}$ parts, and is vertically divided into $2^{N_{mac-V}}$ parts, where $N_{Marco}=2^{N_{mac-H}+N_{mac-V}}$.

Further, in this embodiment, for example, the image is horizontally divided into $2^{N_{mac-H}}$ equal parts, and is vertically divided into $2^{N_{mac-V}}$ equal parts. It should be noted that, the image may be horizontally divided into unequal parts in another embodiment, or vertically divided into unequal parts in yet another embodiment.

Further, for example, the number for horizontally dividing the image is not necessarily a power of 2 in another embodiment, and the number for vertically dividing the image is not necessarily a power of 2 in another yet embodiment; as such modifications are all within the scope of the present disclosure. However, memory addressing is facilitated when the number for dividing the image is a power of 2.

In Step 120, each of the macro-blocks is divided into a plurality of sub-blocks. As shown in FIG. 2, the macro-block is divided into $N_{sub}$ sub-blocks. For illustrative purposes, the sub-blocks are respectively assigned with numbers 1, 2, ..., to $N_{sub}$. More specifically, for example, each macro-block is horizontally divided into $2^{N_{sub-H}}$ parts, and is vertically divided into $2^{N_{sub-V}}$ parts, where $N_{sub}=2^{N_{sub-H}+N_{sub-V}}$.

Further, in this embodiment, for example, each macro-block is horizontally divided into $2^{N_{sub-H}}$ equal parts, and is vertically divided into $2^{N_{sub-V}}$ equal parts. It should be noted that, each macro-block may be horizontally divided into unequal parts in another embodiment, or vertically divided into unequal parts in yet another embodiment.

Further, for example, the number for horizontally dividing each macro-block is not necessarily a power of 2 in another embodiment, and the number for vertically dividing each macro-block is not necessarily a power of 2 in another yet embodiment; as such modifications are all within the scope of the present disclosure.

In Step 130, a meta-block is generated in each of the sub-blocks. In this embodiment, an upper-left corner of the meta-block is aligned with an upper-left corner of the corresponding sub-block. The meta-blocks have a width W_ME between 1 and a width W_SB of the sub-blocks, and a height H_ME between 1 and a height H_SB of the sub-blocks. The width and height of the sub-blocks are not necessarily a power of 2, and may be designed by a designer according to actual requirements.

Taking FIG. 2 for example, an image 200 is horizontally divided into 4 parts and vertically divided into 4 parts, to altogether form 16 ($N_{macro}=16$) macro-blocks 210. Each of the macro-blocks 210 is then horizontally divided into 2 ($N_{sub-H}=16$) parts and vertically divided into 16 ($N_{sub-V}=16$) parts, to altogether form 32 sub-blocks 220. Meta-blocks 230 are respectively generated in the sub-blocks 220.

Again referring to FIG. 2, in this embodiment, an upper-left pixel of the first macro-block is addressed as (x, y)=(0, 0), and an upper-left pixel of the second macro-block is addressed as (x, y)=(W_MB, 0), where W_MB represents the width (in a unit of pixels) of the macro-blocks. An upper-left pixel of the fifth macro-block is addressed as (x, y)=(H_MB, 0), where H_MB represents the height (in a unit of pixels) of the macro-blocks. Addresses of upper-left pixels may be obtained accordingly.

In Step 140, a sum of projection (SOP) of each of the meta-blocks is calculated. The sum of projection is defined as:

$$SOP_{i,j} = \sum_{meta-block} Luma$$

$$i \in [1, N_{macro}], j \in [1, N_{sub}],$$

where Luma represents a pixel luminance, "i" represents a number assigned to the macro-block, and "j" represents a number assigned to the $j^{th}$ sub-block in the $i^{th}$ macro-block. That is, $SOP_{i,j}$ represents a sum of all the pixel luminances of the $j^{th}$ sub-block in the $i^{th}$ macro-block.

In Step 150, according to the sums of projection of the meta-blocks, an SBS confidence and a TB confidence of the single-frame image is calculated. In short, the SBS confidence represents a similarity between a left half and a right half of the image, and the TB confidence represents a similarity between an upper half and a lower half of the image.

More specifically, the SBS confidence is calculated as:

$$\text{Diff\_SBS}_m = \sum_{i=1}^{2^{N_{mac-H}-1}} \sum_{j=1}^{2^{N_{sub-V}}} \sum_{k=1}^{2^{N_{sub-H}}} \text{abs}\big(SOP_{(m-1)*2^{N_{mac-H}}+i,(j-1)*2^{N_{sub-H}}+k} - SOP_{(m-1)*2^{N_{mac-H}}+2^{N_{mac-H}-1}+i,(j-1)*2^{N_{sub-H}}+k}\big)$$

$$m \in [1, 2^{N_{mac-V}}],$$

where "abs" represents an absolute value.

Figure 3A:
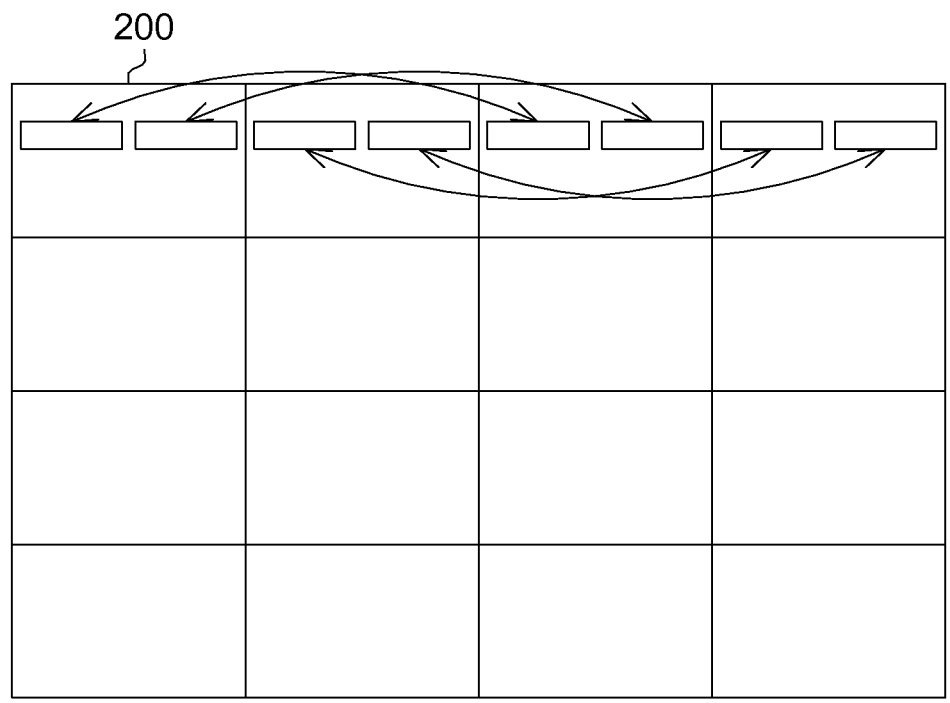
FIG. 3A is a schematic diagram of an SBS confidence according to an embodiment of the present disclosure.

FIG. 3A shows a schematic diagram of the SBS confidence according to an embodiment of the present disclosure. In FIG. 3A, two ends of each arrow represent that the sums of projection of two meta-blocks are subtracted from each other.

Taking FIG. 2 for example:

Diff_SBS$_1$=abs(SOP1−SOP3)+abs(SOP2−SOP4);

Diff_SBS$_2$=abs(SOP5−SOP7)+abs(SOP6−SOP8);

Diff_SBS$_3$=abs(SOP9−SOP11)+abs(SOP10−SOP12); and

Diff_SBS$_4$=abs(SOP13−SOP15)+abs(SOP14−SOP16);

where SOP1 represents the sum of SOP of all the meta-blocks in the first macro-block, and so forth. Thus, it is known in this embodiment that, a difference (i.e. an absolute value of the difference) between a pixel luminance sum of a meta-block of a column in the left half of the image and pixel luminance sum of a meta-block of a corresponding column in the right half of the image is calculated, and all the differences are added up to a sum as the SBS confidence. Thus, the SBS confidence reflects the similarity between the left half and the right half of the image. In conclusion, an image in a 3D SDS format has a small SBS confidence, and an image in a non-3D SDS format has a large SBS confidence.

More specifically, the TB confidence is calculated as:

$$\text{Diff\_TB}_m = \sum_{i=1}^{2^{N_{mac-H}}} \sum_{j=1}^{2^{N_{sub-V}}} \sum_{k=1}^{2^{N_{sub-H}}} \text{abs}\big(SOP_{(m-1)*2^{N_{mac-H}}+i,(j-1)*2^{N_{sub-H}}+k} -$$

-continued $$SOP_{(m-1)*2^{N_{mac-H}}+(N_{Macro}>>1)+i,(j-1)*2^{N_{sub-H}}+k}$$

$$m \in [1, 2^{N_{mac-V}-1}]$$

Figure 3B:
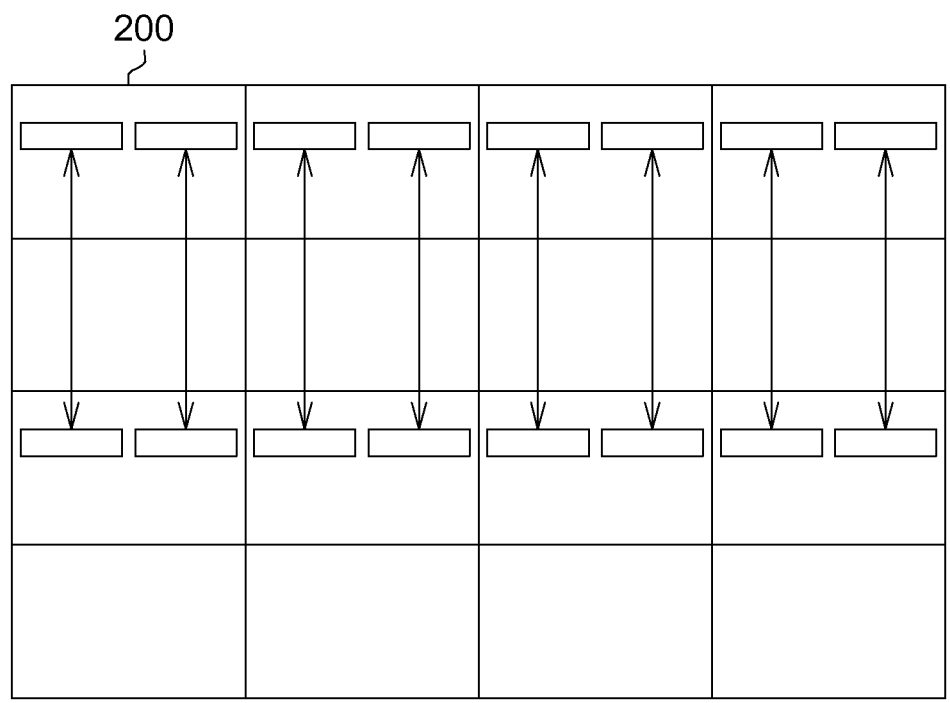
FIG. 3B is a schematic diagram of a TB confidence according to an embodiment of the present disclosure.

FIG. 3B shows a schematic diagram of the TB confidence according to an embodiment of the present disclosure.

Taking FIG. 2 for example:

Diff_TB$_1$=abs(SOP1−SOP9)+abs(SOP2−SOP10)+abs(SOP3−SOP11)+abs(SOP4−SOP12); and

Diff_TB$_2$=abs(SOP5−SOP13)+abs(SOP6−SOP14)+abs(SOP7−SOP15)+abs(SOP8−SOP16).

From the above equations, it is known that in this embodiment, a difference (i.e. an absolute value of the difference) between a pixel luminance sum of a meta-block of a row in the upper half of the image and pixel luminance sum of a meta-block of a corresponding row in the lower half of the image is calculated, and all the differences are added up to a sum as the TB confidence. Thus, the TB confidence reflects the similarity between the upper half and the lower half of the image. In conclusion, an image in a 3D TB format has a small TB confidence, and an image in a non-3D TB format has a large TB confidence.

Figure 4:
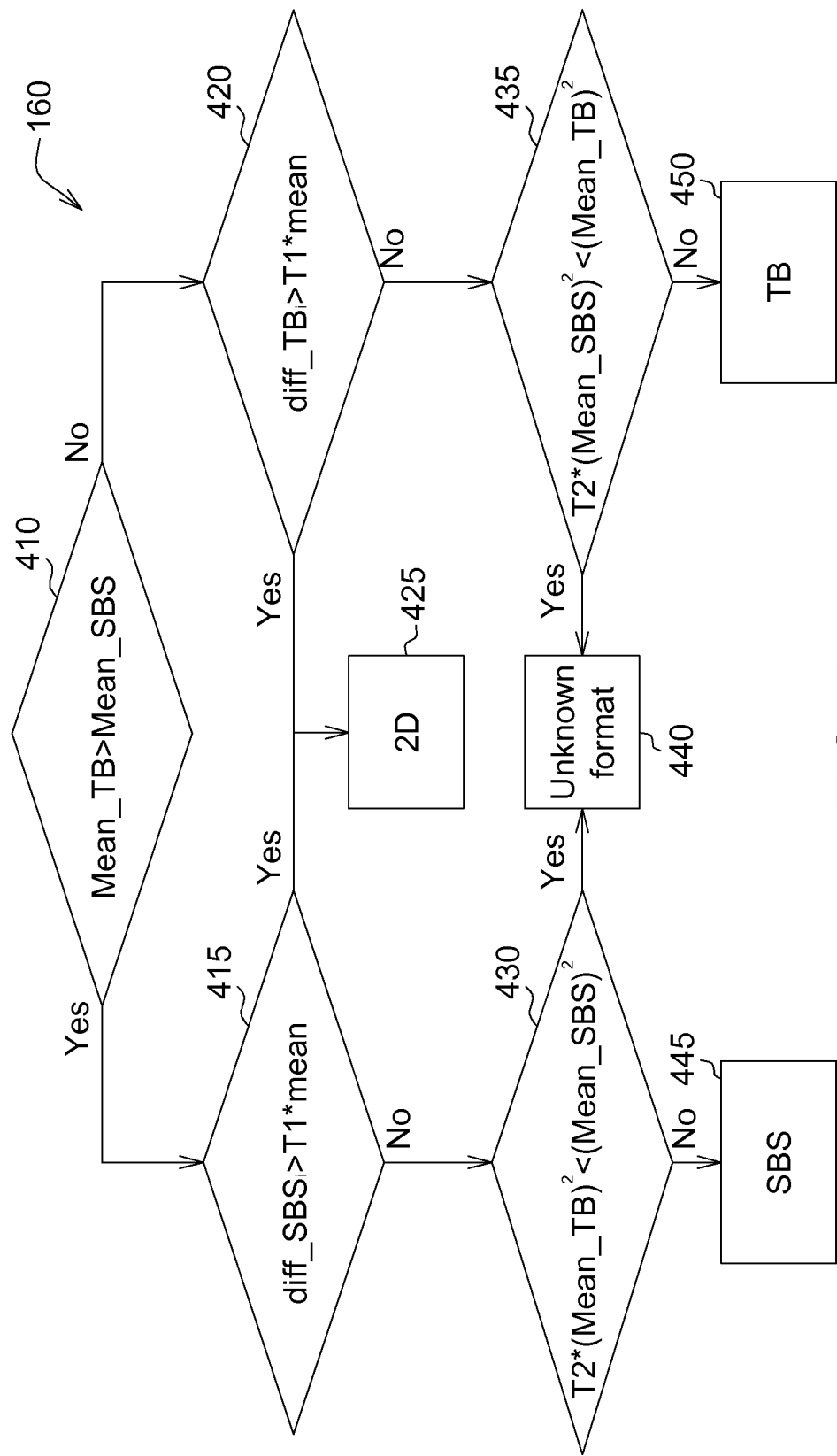
FIG. 4 is a detailed flowchart of a process for detecting an image format according to an image average luminance, an SBS confidence and a TB confidence according to an embodiment of the present disclosure.

In Step 160, a format of the single-frame image is determined according to an image average luminance, the SBS confidence and the TB confidence. Details of Step 160 are as depicted in FIG. 3B. FIG. 4 shows a detailed flowchart of a process for determining the image format according to the image average luminance, the SBS confidence and the TB confidence.

Several parameters are defined as follows:

$$Mean = \frac{\sum_{i=1}^{width} \sum_{j=1}^{height} Luma}{width * height}$$

$$Mean\_SBS = \frac{\sum_{i=1}^{2^{N_{mac-V}}} diff\_SBS_i}{2^{N_{mac-V}}}$$

$$Mean\_TB = \frac{\sum_{i=1}^{2^{N_{mac-V}-1}} diff\_TB_i}{2^{N_{mac-V}-1}}$$

In the above equations, parameters "width" and "height" respectively represent a width and a height of the image, a parameter "Mean" represents the image average luminance, a parameter "Mean_SBS" represents an average SBS confidence, and a parameter "Mean_TB" represents an average TB confidence. In this embodiment, the introduction of the parameter Mean counteracts affects of the image luminance to prevent the image luminance from affecting the determination result of the image format.

In Step 410, a size relation between the parameters Mean_SBS and Mean_TB is determined. When Mean_TB is greater than Mean_SB, it is determined whether any SBS confidence Diff_SBS$_i$ is greater than T1*Mean in Step 415, where T1 is a first threshold. When any SBS confidence Diff_SBS$_i$ is greater than T1*Mean, the image is determined as a 2D image, as shown in Step 425. When the image is determined as a 2D image, a 2D playback mode is utilized for playing the 2D image.

Conversely, when Mean_TB is smaller than Mean_SBS, it is determined whether any TB confidence Diff_TB$_i$ is greater than T1*Mean in Step 420. When any TB confidence Diff_TB$_i$ is greater than T1*Mean, the image is determined as a 2D image, as shown in Step 425.

When all the SBS Diff_SBS$_i$ confidences of the image are smaller than T1*Mean, it is determined whether (T2*(Mean_TB)$^2$) is smaller than (Mean_SBS)$^2$ in Step 430. When (T2*(Mean_TB)$^2$) is smaller than (Mean_SBS)$^2$, it means the image format is undeterminable and is thus an unknown format, as shown in Step 440. For example, when the image is purely subtitles (usually the subtitles occupies a small part at a lower portion of a screen and the screen may be mostly in black), the difference between the SBS confidence and the TB confidence of the image may not be too large. In this embodiment, a subtitle image is regarded as an undeterminable unknown format. When playing an image of such unknown format, the corresponding determination result is discarded. For example, a predetermined playback mode or a previous playback mode is employed for playing the unknown format image.

Conversely, when (T2*(Mean_TB)$^2$) is not smaller than (Mean_SBS)$^2$, it means the SBS confidence of the image is small, and so the image is determined as in a 3D SBS format. The image in the 3D SBS format is then played in an SBS playback mode.

When all the TB confidences Diff_TB$_i$ of the image are smaller than T1*Mean, it is determined whether (T2*(Mean_SBS)$^2$) is smaller than (Mean_TB)$^2$ in Step 435. When (T2*(Mean_SBS)$^2$) is smaller than (Mean_TB)$^2$, the image format is determined as an unknown format in Step 440. Conversely, when (T2*(Mean_SBS)$^2$) is not smaller than (Mean_TB)$^2$, it means the TB confidence of the image is small, and so the image is determined as in a 3D TB format. The image in the 3D TB format is then played in a TB playback mode.

In conclusion, in this embodiment, the auto-detect method for automatically detecting the image format according to the sum of projection, SBS confidence, TB confidence and image average luminance renders high detection accuracy. In addition, costs of hardware according to the embodiment are quite low for further optimizing market competitiveness.

While the disclosure has been described by way of example and in terms of the preferred embodiments, it is to be understood that the disclosure is not limited thereto. On the contrary, it is intended to cover various modifications and similar arrangements and procedures, and the scope of the appended claims therefore should be accorded the broadest interpretation so as to encompass all such modifications and similar arrangements and procedures.

What is claimed is:

1. An auto-detect method for detecting a single-frame image format, comprising:
   dividing a single-frame image into a plurality of macro-blocks;
   dividing each of the macro-blocks into a plurality of sub-blocks;
   generating a meta-block in each of the sub-blocks;
   calculating a pixel luminance sum characteristic value for each of the meta-blocks;
   calculating a first confidence of a left half and a right half of the single-frame image according to the pixel luminance sum characteristic values;
   calculating a second confidence of an upper half and a lower half of the single-frame image according to the pixel luminance sum characteristic values; and determining a format of the single-frame image according to the pixel luminance sum characteristic values, and the first confidence and the second confidence of the single-frame image.

2. The method according to claim 1, wherein the step of dividing the single-frame image into the plurality of macro-blocks comprises:
   dividing the single-frame image horizontally and vertically.

3. The method according to claim 1, wherein the step of dividing each of the macro-blocks into the plurality of sub-blocks comprises:
   dividing each of the macro-blocks horizontally and vertically.

4. The method according to claim 1, wherein an upper-left corner of each meta-block aligns with an upper-left corner of the corresponding sub-block.

5. The method according to claim 1, wherein a width of the meta-block is between 1 and a width of the sub-block, and a height of the meta-block is between 1 and a height of the sub-block.

6. The method according to claim 1, wherein the pixel luminance sum characteristic value is represented as:

$$SOP_{i,j} = \sum_{meta-block} Luma$$

$$i \in [1, N_{macro}],$$

$$j \in [1, N_{sub}],$$

where Luma represents a pixel luminance, i represents a number assigned to an $i^{th}$ macro-block, j represents a number assigned to a $j^{th}$ sub-block in the $i^{th}$ macro-block, $N_{macro}$ represents a total number of the macro-blocks, $N_{sub}$ represents a total number of the sub-blocks in each of the macro-blocks, and $SOP_{i,j}$ represents a sum of all the pixel luminances of the $j^{th}$ sub-block in the $i^{th}$ macro-block.

7. The method according to claim 6, wherein the step of calculating the first confidence $Diff\_SBS_m$ of the image comprises:

$$Diff\_SBS_m = \sum_{i=1}^{2^{N_{mac-H}-1}} \sum_{j=1}^{2^{N_{sub-V}}} \sum_{k=1}^{2^{N_{sub-H}}} abs\left(SOP_{(m-1)*2^{N_{mac-H}}+i,(j-1)*2^{N_{sub-H}}+k} - SOP_{(m-1)*2^{N_{mac-H}}+2^{N_{mac-H}-1}+i,(j-1)*2^{N_{sub-H}}+k}\right)$$

$$m \in [1, 2^{N_{mac-V}}],$$

where abs represents an absolute value.

8. The method according to claim 7, wherein the step of calculating the second confidence $Diff\_TB_m$ comprises:

$$Diff\_SBS_m = \sum_{i=1}^{2^{N_{mac-H}}} \sum_{j=1}^{2^{N_{sub-V}}} \sum_{k=1}^{2^{N_{sub-H}}} abs\left(SOP_{(m-1)*2^{N_{mac-H}}+i,(j-1)*2^{N_{sub-H}}+k} - SOP_{(m-1)*2^{N_{mac-H}}+(N_{Macro}>>1)+i,(j-1)*2^{N_{sub-H}}+k}\right)$$

$$m \in [1, 2^{N_{mac-V}-1}].$$

9. The method according to claim 8, wherein the step of determining the format of the single-frame image comprises:
   comparing a first average value of the first confidence and a second average value of the second confidence of the single-frame image;
   when the first average value is smaller than the second average value, and the first confidence is greater than a product of a first threshold and an image average luminance characteristic value, determining the single-frame image as a two-dimensional (2D) image;
   when the first average value is greater than the second average value, and the second confidence is greater than the product of the first threshold and the image average luminance characteristic value, determining the single-frame image as a 2D image;
   when the first average value is smaller than the second average value, all the first confidences of the single-frame image are smaller than the product of the first threshold and the image average luminance characteristic value, and $T2*(Mean\_TB)^2$ is smaller than $(Mean\_SBS)^2$, determining the format of the single-frame image as an unknown format, where T2 represents a second threshold, Mean_SBS represents the first average value, and Mean_TB represents the second average value;
   when the first average value is smaller than the second average value, all the first confidences of the single-frame image are smaller than the product of the first threshold and the image average luminance characteristic value, and $T2*(Mean\_TB)^2$ is greater than $(Mean\_SBS)^2$, determining the format of the single-frame image as a three-dimensional (3D) side-by-side (SBS) format;
   when the first average value is greater than the second average value, all the second confidences of the single-frame image are smaller than the product of the first threshold and the image average luminance characteristic value, and $T2*(Mean\_SBS)^2$ is smaller than $(Mean\_TB)^2$, determining the format of the single-frame image as an unknown format; and
   when the first average value is greater than the second average value, all the second confidences of the single-frame image are smaller than the product of the first threshold and the image average luminance characteristic value, and $T2*(Mean\_SBS)^2$ is greater than $(Mean\_TB)^2$, determining the format of the single-frame image as a 3D top-and-bottom (TB) format.

10. A playback method for a single-frame image, comprising:
    dividing the single-frame image into a plurality of macro-blocks;
    dividing each of the macro-blocks into a plurality of sub-blocks;
    generating a meta-block in each of the sub-blocks;
    calculating a pixel luminance sum characteristic value for each of the meta-blocks;
    determining whether a first half and a second half of the single-frame image are similar according to the pixel luminance sum characteristic values, and determining the single-frame image as a 3D format when the first half and the second half of the single-frame image are similar; and
    playing the single-frame image according to the determined image format.

11. The method according to claim 10, wherein the step of dividing the single-frame image into the plurality of macro-blocks comprises:
    dividing the single-frame image horizontally and vertically.

12. The method according to claim 10, wherein the step of dividing each of the macro-blocks into the plurality of sub-blocks comprises:
   dividing each of the macro-blocks horizontally and vertically.

13. The method according to claim 10, wherein an upper-left corner of each meta-block aligns with an upper-left corner of the corresponding sub-block.

14. The method according to claim 10, wherein a width of the meta-block is between 1 and a width of the sub-block, and a height of the meta-block is between 1 and a height of the sub-block.

15. The method according to claim 10, wherein it is determined whether a left half and a right half of the single-frame image are similar according to the pixel luminance sum characteristic values, and the single-frame image is determined as a 3D SBS format when the left half and the right half of the single-frame image are similar.

16. The method according to claim 15, wherein it is determined whether an upper half and a lower half of the single-frame image are similar according to the pixel luminance sum characteristic values, and the single-frame image is determined as a 3D TB format when the upper half and the lower half of the single-frame image are similar.

17. The method according to claim 16, wherein the pixel luminance sum characteristic value is represented as:

$$SOP_{i,j} = \sum_{meta-block} Luma$$

$$i \in [1, N_{macro}],$$

$$j \in [1, N_{sub}],$$

where Luma represents a pixel luminance, i represents a number assigned to an $i^{th}$ macro-block, j represents a number assigned to a $j^{th}$ sub-block in the $i^{th}$ macro-block, $N_{macro}$ represents a total number of the macro-blocks, $N_{sub}$ represents a total number of the sub-blocks in each of the macro-blocks, and $SOP_{i,j}$ represents a sum of all the pixel luminances of the $j^{th}$ sub-block in the $i^{th}$ macro-block.

18. The method according to claim 17, further comprising:
   calculating a first confidence $Diff\_SBS_m$ of the image, $$Diff\_SBS_m = \sum_{i=1}^{2^{N_{mac-H}-1}} \sum_{j=1}^{2^{N_{sub-V}}} \sum_{k=1}^{2^{N_{sub-H}}} abs\bigl(SOP_{(m-1)*2^{N_{mac-H}}+i,(j-1)*2^{N_{sub-H}}+k} - SOP_{(m-1)*2^{N_{mac-H}}+2^{N_{mac-H}-1}+i,(j-1)*2^{N_{sub-H}}+k}\bigr)$$

$$m \in [1, 2^{N_{mac-V}}],$$

where abs represents an absolute value; and
   calculating a second confidence $Diff\_TB_m$ of the image, $$Diff\_TB_m = \sum_{i=1}^{2^{N_{mac-H}}} \sum_{j=1}^{2^{N_{sub-V}}} \sum_{k=1}^{2^{N_{sub-H}}} abs\bigl(SOP_{(m-1)*2^{N_{mac-H}}+i,(j-1)*2^{N_{sub-H}}+k} - SOP_{(m-1)*2^{N_{mac-H}}+(N_{Marco}>>1)+i,(j-1)*2^{N_{sub-H}}+k}\bigr)$$

$$m \in [1, 2^{N_{mac-V}-1}].$$

19. The method according to claim 18, wherein the step of determining the format of the single-format image as the SBS format comprises:
   when a first average value of the first confidence is smaller than a second average value of the second confidence of the single-frame image, all the first confidences of the single-frame image are smaller than a product of a first threshold and an image average luminance characteristic value, and $T2*(Mean\_TB)^2$ is greater than $(Mean\_SBS)^2$, determining the format of the single-frame image as the 3D SBS format, where T2 represents a second threshold, Mean_SBS represents the first average value, and Mean_TB represents the second average value.

20. The method according to claim 19, wherein the step of determining the format of the single-frame image as the TB format comprises:
   when the first average value is greater than the second average value, all the second confidences of the single-frame image are smaller than the product of the first threshold and the image average luminance characteristic value, and $T2*(Mean\_SBS)^2$ is greater than $(Mean\_TB)^2$, determining the format of the single-frame image as the 3D TB format.

21. The method according to claim 20, further comprising:
   when the first average value is smaller than the second average value, and the first confidence is greater than the product of the first threshold and the image average luminance characteristic value, determining the single-frame image as a 2D image; and
   when the first average value is greater than the second average value, and the second confidence is greater than the product of the first threshold and the image average luminance characteristic value, determining the single-frame image as a 2D image.

22. The method according to claim 21, further comprising:
   when the first average value is smaller than the second average value, all the first confidences of the single-frame image are smaller than the product of the first threshold and the image average luminance characteristic value, and $T2*(Mean\_TB)^2$ is smaller than $(Mean\_SBS)^2$, determining the format of the single-frame image as an unknown format; and
   when the first average value is greater than the second average value, all the second confidences of the single-frame image are smaller than the product of the first threshold and the image average luminance characteristic value, and $T2*(Mean\_SBS)^2$ is smaller than $(Mean\_TB)^2$, determining the format of the single-frame image as an unknown format.

* * * * *